US008109470B2

(12) United States Patent
Sandiford et al.

(10) Patent No.: US 8,109,470 B2
(45) Date of Patent: Feb. 7, 2012

(54) OVERPRESSURE PROTECTOR

(75) Inventors: J. Patrick Sandiford, Bristol (GB); Mark Smiles, Bristol (GB)

(73) Assignee: Airbus Operations Limited, Bristol (GB)

( * ) Notice: Subject to any disclaimer, the term of this patent is extended or adjusted under 35 U.S.C. 154(b) by 979 days.

(21) Appl. No.: 11/956,502

(22) Filed: Dec. 14, 2007

(65) Prior Publication Data

US 2008/0149772 A1    Jun. 26, 2008

(30) Foreign Application Priority Data

Dec. 21, 2006 (GB) .................... 0625670.5

(51) Int. Cl.
*B64D 37/10* (2006.01)
*B64D 37/32* (2006.01)
(52) U.S. Cl. ................. 244/135 R; 244/135 C
(58) Field of Classification Search .......... 244/135 R, 244/135 B, 136, 135 C
See application file for complete search history.

(56) References Cited

U.S. PATENT DOCUMENTS

| | | | | | |
|---|---|---|---|---|---|
| 2,195,213 | A | * | 3/1940 | Heigis | 137/13 |
| 2,772,568 | A | * | 12/1956 | Samaritano | 73/322 |
| 3,237,639 | A | | 3/1966 | Mosher | |
| 3,590,559 | A | * | 7/1971 | Bragg et al. | 96/174 |
| 3,782,400 | A | | 1/1974 | Hardison et al. | |
| 4,552,331 | A | | 11/1985 | Smart, Jr. | |
| 5,046,686 | A | | 9/1991 | Carla et al. | |
| 5,138,559 | A | * | 8/1992 | Kuehl et al. | 702/55 |
| 6,019,126 | A | | 2/2000 | Kelada | |

FOREIGN PATENT DOCUMENTS

| | | |
|---|---|---|
| GB | 1264841 | 2/1972 |
| GB | 2388645 A | 11/2003 |
| WO | 0075543 A1 | 12/2000 |

OTHER PUBLICATIONS

GB Search Report for GB0625670.5 dated Jul. 26, 2007 (claims 17-29).
GB Search Report for GB0625670.5 dated Jul. 26, 2007 (claims 30-44).

* cited by examiner

*Primary Examiner* — Joshua Michener
*Assistant Examiner* — Brian M O'Hara
(74) *Attorney, Agent, or Firm* — Lowe, Hauptman, Ham & Berner, LLP

(57) ABSTRACT

An aircraft fuel tank assembly comprises a first fuel tank, a second fuel tank and a tank-to-tank overpressure protector therebetween. The overpressure protector has a closed state and an open state. The fuel tank assembly further comprises an indicator for indicating whether the overpressure protector is in the open or closed state, the indication of the indicator being able to be sensed at a location outside of the fuel tanks. The fuel tank assembly may comprise a test mechanism arranged to effect movement of the overpressure valve from the closed state to the open state, the test mechanism being operable from a location outside a fuel tank. The fuel tank assembly may comprise an overpressure valve re-set mechanism, the re-set mechanism being operable from a location outside the fuel tanks.

14 Claims, 12 Drawing Sheets

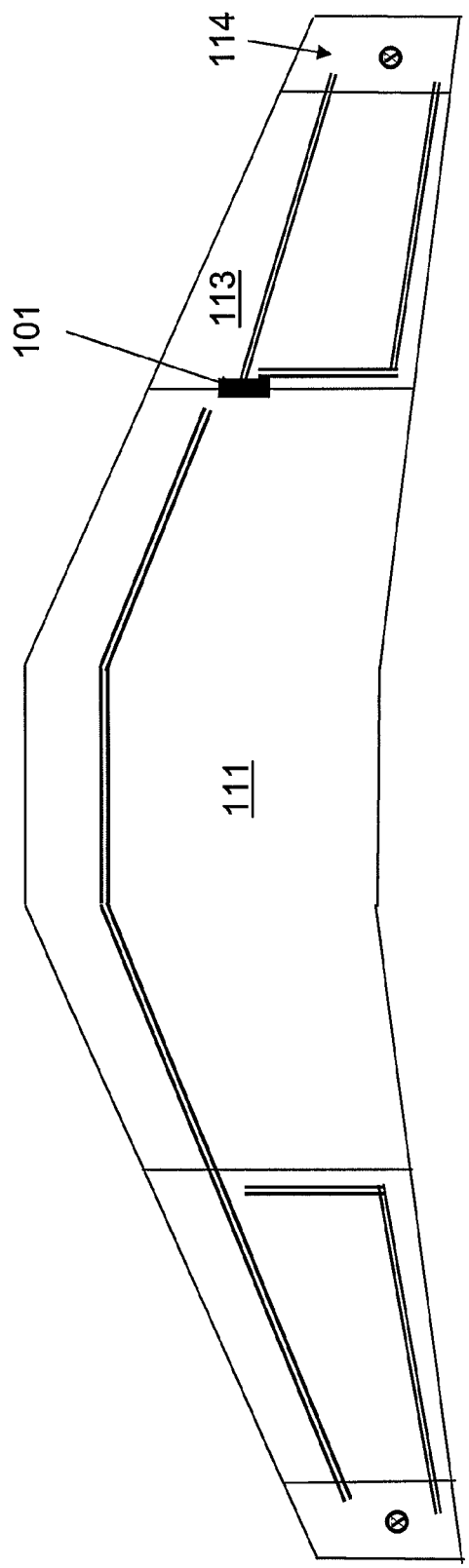

OVERPRESSURE PROTECTOR

RELATED APPLICATIONS

The present application is based on, and claims priority from, British Application Number 0625670.5, filed Dec. 21, 2006, the disclosure of which is hereby incorporated by reference herein in its entirety.

TECHNICAL FIELD

The present invention relates to aircraft and more particularly to aircraft fuel tank arrangements including overpressure protection.

BACKGROUND OF THE INVENTION

It is desirable in an aircraft fuel tank system, to have an overpressure protector to relieve excess pressure to prevent the pressure from reaching a dangerous level.

In a fuel tank system, high pressure differentials may occur when, for example, the aircraft is being refuelled (resulting in high pressure in the tank relative to the atmosphere), and the fuel venting system between individual tanks becomes blocked (resulting in a large pressure differential across the fuel tanks).

It is known to fit an overpressure protector in the form of an overpressure valve. The overpressure valve is typically in the form of a poppet valve or the like and is adapted to move from a closed state to an open state in the event of an excessive pressure differential. Another known type of overpressure protector is a frangible disc. The frangible disc may be arranged to adopt an open state by failing (rupturing) when the pressure differential exceeds a certain level.

Where an overpressure protector is used for tank-to-tank pressure relief, it is often difficult, if not impossible, to tell from outside the fuel tanks whether the overpressure protector is in the open or closed state, or whether the protector has recently operated between those two states. It may therefore be necessary to regularly access the interior of the fuel tanks to check the state of the overpressure protector. Such checking may be expensive and/or time consuming.

A significant time period may elapse between an event causing the movement of the overpressure protector to the open state, and the act of checking the overpressure protector (by accessing the interior of the fuel tanks). Fault detection may therefore be delayed.

Overpressure valves tend to have a number of advantageous features over some other types of overpressure protector such as frangible discs (for example, frangible discs are limited to once-only operation). However, overpressure valves may be susceptible to jamming. In the event the overpressure valve jams, excessive pressure can build up leading to catastrophic failure of the system or component(s) associated with the overpressure valve. It may therefore be necessary to fit a different overpressure protector, such as a frangible disc (either instead of, or additional to, the overpressure valve) in order to provide a more reliable and/or a backup means of pressure relief. Whilst the different overpressure protector may be reliable, it will not necessarily be able to provide many of the advantages associated with an overpressure valve. The different overpressure protector may also have its own associated disadvantages, be expensive to fit and/or can add undesirable weight to the aircraft (for example due to the associated piping/venting systems required).

Overpressure valves tend to need to be manually reset from the open state to the closed state after use. Resetting the valve may involve accessing the interior of a fuel tank, or removing significant aircraft structure to access the overpressure valve. Thus, it can be an expensive and/or time consuming task to reset the valve.

SUMMARY OF THE INVENTION

The present invention seeks to mitigate or remove at least some of the above-mentioned disadvantages.

According to a first aspect of the present invention, the re is provided air craft fuel tank assembly comprising a first fuel tank, a second fuel tank and a tank-to-tank overpressure protector therebetween, wherein the overpressure protector has a closed state for substantially preventing fluid communication through the overpressure protector, and an open state for enabling fluid communication through the overpressure protector to provide pressure relief, and the fuel tank assembly further comprises an indicator for indicating whether the overpressure protector is in the open or closed state, the indication of the indicator being able to be sensed at a location outside of the first and second fuel tanks.

By providing an indication (of the state of the valve) which is able to be sensed at a location outside of the first and second fuel tanks, the need to access the interior of the fuel tanks is reduced. This may reduce aircraft down-time and costs to the aircraft operator. The indication may also enable earlier detection of when the overpressure protector has adopted the open state and thus earlier detection of a possible fault.

It will be appreciated that the indicator may be arranged to provide a 'real time' indication indicating whether the overpressure protector is in the open or closed state. Alternatively, or additionally, the indicator may be arranged to provide an indication that the overpressure protector has, at some point (for example since it was last inspected), moved between the closed and open states. The latter type of indication may be especially advantageous in an embodiment in which the overpressure protector is automatically re-set.

The indicator may be mechanically associated with the overpressure protector. Such an arrangement is especially advantageous since the use of electronics in or near the aircraft fuel tanks tends to be restricted for safety reasons. The indicator may be directly mechanically linked to the overpressure protector.

The indicator may comprise a follower element associated with the overpressure protector so as to be moveable dependent on the state of the overpressure protector, such that the indication of the indicator is generated dependent on the position of the follower element. For example, the follower element may be hidden from view when the overpressure protector is in the closed state, but be arranged to move to a visible position when the overpressure protector is in the open state, or vice versa. The follower element may be in the form of a latch element. The follower element may be biased, and preferably resiliently biased, against the overpressure protector.

The indicator may comprise a flag, the flag being moveable between a hidden position and a visible position dependent on the state of the overpressure protector. The flag may be part of the follower element. For example, the flag may be in the form of a coloured marker on the follower element. Alternatively or additionally, the flag may be a separate element associated with the follower element. The flag may be moveable between a hidden position and a visible position dependent on the position of the follower element. For example, the flag may be resiliently mounted so as to adopt a visible position when the follower element moves (dependent on the state of the overpressure protector). The flag may be resiliently biased against the follower element. Of course, the flag may be associated in other ways, for example through a camming arrangement, so as to move in response to the state of the overpressure protector.

The indicator may comprise a fiber optic cable arranged to transmit a signal dependent on the state of the overpressure protector. The fiber optic cable may be arranged to output the signal, for use as the indication, to a location outside the first and second fuel tanks. The fiber optic cable may be associated with the follower element, and/or the flag and may be arranged to transmit a signal that is representative of the position of the follower element and/or flag to a location outside the first and second fuel tanks.

The indicator may comprise a position sensor, arranged to transmit a signal dependent on the state of the overpressure protector. The position sensor may be arranged to emit a signal dependent on the position of an element associated with the overpressure protector, for example the follower element, and thus the state of the overpressure protector.

The part of the indicator, for example a flag, arranged to make the indication may be wholly located outside the first and second fuel tanks. The indication may be sensed from a location outside the fuel tanks with non-intrusive means. The indicator itself may be wholly located outside the first and second fuel tanks.

The indication of the indicator may be visible. Alternatively, or additionally, the indication may be audible. The indication of the indicator may be able to be sensed in the aircraft cockpit. The indication of the indicator may be able to be sensed at a location in the vicinity of a wing of the aircraft. The indication of the indicator may be visible on the exterior of a wing of the aircraft. The indication of the indicator may be operable to be visible on the exterior of the wing of the aircraft in which the overpressure protector is located. The indication may be visible on the underside of the aircraft wing. The indication of the indicator may be able to be sensed from a location from which the fuel tanks may be refuelled. For example, the aircraft may include a re-fuel control panel, the indicator being visible on the re-fuel control panel. The indicator may be arranged to indicate at a plurality of different locations on the aircraft.

The aircraft may comprise a transparent panel defining part of the exterior surface of the wing. The transparent panel may define part of the exterior surface of the wing in the vicinity of the overpressure protector. At least part of the indicator may be enclosed behind the transparent panel, whereby the indication of the indicator is visible through the transparent panel. For example, the flag may be moveable to a visible position behind the transparent panel. Such an arrangement tends not to interfere with the wing aerodynamics. The transparent panel may be removable.

The overpressure protector may be arranged between a first fuel tank and a surge tank. The overpressure protector may be arranged between a central fuel tank, and an outboard fuel tank.

The overpressure protector may be in the form of a frangible disc. The overpressure protector is preferably in the form of an overpressure valve.

The aircraft fuel tank overpressure protector and the associated indicator may of course be manufactured and provided separately from the fuel tank(s). There is also provided an aircraft fuel tank overpressure protector unit for use in the fuel tank assembly according to the first aspect of the invention. The unit may incorporate any of the features described with reference to the first aspect of the invention. The unit may comprise an overpressure protector and an indicator, preferably mechanically associated therewith, for providing an indication remote from the overpressure protector. The unit may comprise a follower element associated with the overpressure protector so as to be moveable dependent on the state of the overpressure protector, such that the indication of the indicator is generated dependent on the position of the follower element. An embodiment according to this part of the present invention may be in the form of an aircraft fuel tank overpressure protector unit comprising an overpressure protector and an indicator mechanically associated therewith, for providing an indication remote from the overpressure protector of the state of the overpressure protector.

The overpressure protector may be a spring-loaded overpressure valve comprising a shaft and a sealing member moveable between an open state and a closed state. The follower element may be biased against the shaft or sealing member so as to be moveable dependent on the state of the overpressure valve. The unit may further comprise a flag, the flag being biased against the follower element so as to be moveable between a hidden position and a visible position dependent on the position of the follower element. The unit may comprise a fiber optic cable arranged to transmit a signal dependent on the state of the overpressure protector.

There is also provided a method of detecting the state of an overpressure protector on an aircraft, comprising the steps of providing a fuel tank arrangement according to the first aspect of the invention, and sensing the indication at a location outside of the first and second fuel tanks.

There is yet further provided a method of detecting the state of an overpressure protector in an aircraft fuel tank, the method comprising the steps of: providing a fuel tank assembly having a plurality of fuel tanks, providing an overpressure protector between two of the fuel tanks, the overpressure protector operating to reduce a pressure differential between the two fuel tanks, the operation of the overpressure protector causing an indication to be made, and sensing the indication at a location outside of the two fuel tanks.

According to a second aspect of the invention there is provided an aircraft fuel tank assembly comprising a fuel tank and an overpressure valve associated therewith, wherein the overpressure valve has a closed state for substantially preventing fluid communication through the overpressure valve, and an open state for enabling fluid communication through the overpressure valve to provide pressure relief, and the fuel tank assembly further comprises a test mechanism arranged to effect movement of the overpressure valve from the closed state to the open state, the test mechanism being operable from a location outside the fuel tank. The second aspect of the present invention may therefore enable an engineer to change the state of the overpressure valve, without accessing the fuel tank interior. This can reduce aircraft down-time and costs to the airline should the state of the valve need changing. Regular checks of the valve may be performed without the need to disrupt the aircraft for long periods of time. The ability to test the valve also makes it more able to be relied upon, possibly mitigating the need for additional overpressure protectors.

The overpressure valve may be arranged to move from the open state to the closed state under the action of a resilient bias and/or a pressure differential across the valve. The test mechanism may be arranged to effect movement of the overpressure valve from the open state to the closed state.

The overpressure valve may be between the surge tank and the exterior of the aircraft. Preferably however, the aircraft fuel tank arrangement comprises a second fuel tank and the overpressure valve is a tank-to-tank overpressure valve between the first fuel tank and the second fuel tank, the test mechanism being operable from a location outside the first and second fuel tanks.

The test mechanism may be arranged to change the pressure in the region of the valve. The test mechanism may comprise a pressure chamber associated with the overpressure valve, and a conduit connected between the pressure chamber and a location outside the fuel tank, whereby application of pressure to the pressure chamber via the conduit, effects movement of the overpressure valve from the closed state to the open state. Such an arrangement may reduce the need for fixed linkages or a direct mechanical connection with the valve, to effect movement of the valve. For example, the conduit may be a flexible pipe. The test mechanism may therefore be relatively simple, cheap and/or easy to install. The pressure chamber arrangement may also reduce the need for a large mechanical lever action, which may otherwise be required to open the valve.

The pressure chamber may be located substantially at one end of the valve. The valve may be arranged to open by application of pressure to the pressure chamber, the applied pressure being greater than the pressure on the other side of the pressure chamber. The applied pressure may be sufficiently greater than the pressure on the other side of the chamber so as to overcome an additional resilience in the valve. The pressure chamber may open, on the other side, to the interior of the fuel tank.

Preferably, the test mechanism is located relatively close to the overpressure valve. The test mechanism may be operable from a location on the surface of a wing on the aircraft.

The aircraft fuel tank overpressure valve and the associated test mechanism may of course be manufactured and provided separately from the fuel tank assembly of the second aspect of the invention. There is also provided an aircraft fuel tank overpressure valve unit for use in the fuel tank assembly of the second aspect of the invention. The unit may incorporate any of the features described with reference to the second aspect of the invention. The unit may comprise an overpressure valve and a test mechanism arranged to effect movement of the valve from a closed state to an open state, the test mechanism being operable remotely from the valve. The test mechanism may comprise a pressure chamber associated with the overpressure valve, and a conduit connected to the pressure chamber, whereby application of pressure to the pressure chamber via the conduit, effects movement of the overpressure valve from the closed state to the open state. An embodiment according to this part of the present invention may be in the form of an aircraft fuel tank overpressure valve unit comprising an overpressure valve and test mechanism associated therewith, for testing the operation of the valve, the test mechanism being arranged to be operable from a location remote from the overpressure valve.

There is also provided a method of testing an aircraft fuel tank overpressure valve comprising the steps of providing a fuel tank arrangement according to the second aspect of the invention, and testing the valve with the test-mechanism to move the valve from the closed state to the open state.

There is yet further provided a method of testing an aircraft fuel tank overpressure valve in a fuel tank comprising the steps of: providing a fuel tank, providing an overpressure valve in the fuel tank, which is arranged to operate to allow relief of pressure in the tank, and testing from outside the fuel tank, the operation of the overpressure protector, thereby causing the overpressure protector to operate. The testing step is preferably performed by means of operating a testing mechanism at a location outside the fuel tank. The overpressure valve may be located wholly inside the fuel tank.

The second aspect of the invention may be used in conjunction with the first aspect of the invention. Such an arrangement is especially advantageous since the indicator may provide direct feedback as to the state of the overpressure valve when the test mechanism is operated. It may be possible to determine the state of the overpressure valve indirectly without the use of the first aspect of the invention. For example, the state of the overpressure valve may be determined from fuel flow data.

Any features of the first aspect of the invention may be incorporated into the second aspect of the invention and vice versa. For example, the aircraft fuel tank assembly may comprise a test mechanism arranged to effect movement of the overpressure valve from the closed state to the open state, the test mechanism being operable from a location outside the fuel tank, and the fuel tank assembly may comprise an indicator for indicating whether the overpressure protector is in the open or closed state, the indication of the indicator being able to be sensed at a location outside of the first and second fuel tanks. The indication of the indicator may be able to be sensed in the vicinity of the test mechanism.

The test mechanism and the indicator may share one or more common elements. For example, the indicator and the test mechanism may be mechanically associated with the overpressure valve via the same element.

According to a third aspect of the invention there is provided an aircraft fuel tank assembly comprising a first fuel tank, a second fuel tank and a tank-to-tank overpressure valve therebetween, wherein the overpressure valve has a closed state for substantially preventing fluid communication through the overpressure valve, and an open state for enabling fluid communication through the overpressure valve to provide pressure relief, and the aircraft further comprises an overpressure valve re-set mechanism arranged to enable movement of the overpressure valve from the open state to the closed state, the re-set mechanism being operable from a location outside the first and second fuel tanks. Such an arrangement may enable the valve to be re-set with relative ease and may mitigate the need to access the fuel tanks in order to access the valve. The re-set mechanism may be mechanically associated, and preferably directly mechanically associated, with the overpressure valve. Such an arrangement is especially advantageous since the use of electronics in or near the aircraft fuel tanks tends to be restricted for safety reasons.

The re-set mechanism may comprise a latch element moveable between an unlatched position and a latched position, the latch element in the latched position being arranged to hold the valve in the open state. The latch element may be operable, from a location outside the fuel tanks, to move from the latched position to the unlatched position, such that movement of the latch element to the unlatched position enables movement of the valve from the open state to the closed state. The overpressure valve may be resiliently biased towards the closed state. The latch element may be arranged to hold the valve in the open state against the resilient bias, and movement of the latch element to the latched position may be such that movement of the latch element to the unlatched position enables movement of the valve from the open state to the closed state under the resilient bias.

The latch element may be moveable via a linkage that is operable from a location remote from the fuel tanks. The latch element itself may be directly operable from a location outside the first and second fuel tanks.

The latch element may be biased, and preferably resiliently biased, towards the latched position.

The re-set mechanism is preferably arranged to merely enable movement of the overpressure valve from the open state to the closed state. For example, the re-set mechanism may simply enable the overpressure valve to return to the closed state from the open state under a biasing in the valve and/or a pressure differential across the valve. The re-set mechanism may be arranged to effect movement of the overpressure valve from the open state to the closed state. For example, the re-set mechanism may comprise a mechanical linkage, operable from outside the fuel tanks, for driving the valve from the open state to the closed state.

The aircraft may comprise a removable panel, the removable panel defining part of the exterior surface of the wing in the vicinity of the overpressure valve. At least part of the re-set mechanism may be enclosed behind the removable panel, whereby the re-set mechanism is operable from the exterior of the aircraft following removal of the panel. The removable panel may be transparent.

The aircraft fuel tank overpressure valve and the associated re-set mechanism may of course be manufactured and provided separately from the fuel tank assembly of the third aspect of the invention. There is also provided an aircraft fuel tank overpressure valve unit for use in the fuel tank assembly of the third aspect of the invention. The unit may incorporate any of the features described with reference to the third aspect of the invention. The unit may comprise an overpressure valve and a re-set mechanism arranged to enable movement of the valve from an open state to a closed state, the re-set mechanism being operable from a location remote from the valve. The re-set mechanism may be mechanically associated with the valve. The overpressure valve may be spring-loaded towards the closed state. The re-set mechanism may comprise a latch element moveable between an unlatched position and a latched position, the latch element in the latched position being arranged to hold the valve, against the bias, in the open state, and the reset mechanism being operable to move the latch element from the latched position to the unlatched position, such that movement of the latch element to the unlatched position enables movement of the valve from the open state to the closed state under the bias. An embodiment according to this part of the present invention may be in the form of an aircraft fuel tank overpressure valve unit comprising an overpressure valve and re-set mechanism associated therewith, for re-setting the valve once operated, the re-set mechanism being arranged to be operable from a location remote from the overpressure valve.

There is also provided a method of re-setting an aircraft fuel tank overpressure valve, the method comprising the steps of providing a fuel tank arrangement according to the third aspect of the invention, and re-setting the valve, from outside the first and second fuel tanks, to move the valve from the open state to the closed state.

There is yet further provided a method of re-setting an aircraft fuel tank overpressure valve in a fuel tank, the method comprising the steps of: providing a fuel tank assembly having a plurality of fuel tanks, providing an overpressure valve between two of the fuel tanks, the overpressure protector operating to reduce a pressure differential between the two fuel tanks, and subsequently resetting from outside the two fuel tanks the overpressure protector. The re-setting step is preferably performed by means of operating a re-set mechanism at a location outside the two fuel tanks.

The third aspect of the invention may be used in conjunction with the first and/or second aspects of the invention. Any features of the first aspect and/or second aspect of the invention may be incorporated into the third aspect of the invention and vice versa. An arrangement in which the first and third aspects of the invention are combined is especially advantageous since the re-set mechanism may be operated in response to the indication of the indicator. For example, the aircraft may comprise a re-set mechanism arranged to enable movement of the overpressure valve from the open state to the closed state, the re-set mechanism being operable from a location outside the first and second fuel tanks, and an indicator for indicating whether the overpressure protector is in the open or closed state, the indication of the indicator being able to be sensed at a location outside of the first and second fuel tanks.

An arrangement in which the second and third aspects of the invention are combined is also especially advantageous since the re-set mechanism may be arranged to move the valve from the open to closed state, the test mechanism having moved the valve from the closed to open state.

Different aspects of the invention may share common elements. For example, in an embodiment of the invention, the latch element and the follower element may be defined by the same element.

In an arrangement in which the first and third aspects of the invention are combined, the indication of the indicator may be associated with the position of the latch element. The latch element may comprise a flag for indicating the state of the overpressure valve.

There is also provided an aircraft wing comprising at least part of a fuel tank assembly according to any aspect of the present invention. For example, an aircraft wing may comprise a fuel tank and an overpressure protector, in accordance with any aspect of the invention. In embodiments in which the overpressure protector is a tank-to-tank overpressure protector, an aircraft wing may comprise an overpressure protector for use in the fuel tank assembly according to an aspect of the invention and arranged, in use, to connect a first fuel tank in the aircraft wing to a second fuel tank elsewhere in an aircraft. The second fuel tank may, for example, be in the aircraft fuselage.

For example, in some embodiments there may be provided an aircraft wing comprising at least one fuel tank, and a tank-to-tank overpressure protector, for connecting the at least one fuel tank to a further fuel tank, wherein the overpressure protector has a closed state for substantially preventing fluid communication through the overpressure protector, and an open state for enabling fluid communication through the overpressure protector to provide pressure relief, and wherein the aircraft wing further comprises an indicator for indicating whether the overpressure protector is in the open or closed state, the indication of the indicator being able to be sensed at a location outside of the fuel tank.

There is also provided an aircraft comprising a fuel tank assembly according to any aspect of the present invention.

The present invention is of particular application to larger aircraft. The aircraft is preferably heavier than 50 tonnes dry weight, and more preferably heavier than 200 tonnes dry weight. The aircraft is preferably of a size equivalent to an aircraft designed to carry more than 75 passengers, and more preferably more than 200 passengers.

The present invention is of particular application to aircraft comprising large fuel tanks. For example, the fuel tanks may be designed to hold over 50,000 liters of fuel. The fuel tanks may be designed to hold over 100,000 liters of fuel. The overpressure protector is preferably associated with a large fuel tank. The overpressure protector may be located between a large central tank and a smaller outer tank.

DESCRIPTION OF THE DRAWINGS

Various embodiments of the invention will now be described, by way of example only, with reference to the accompanying schematic drawings of which:

FIG. 5 shows a schematic of a fuel tank assembly in the first embodiment of the invention;

DETAILED DESCRIPTION

There now follows a brief description of FIGS. 1 to 3, which description is provided by way of background to the description of the embodiments of the invention, which are described later with reference to FIGS. 4a to 11.

Figure 1:
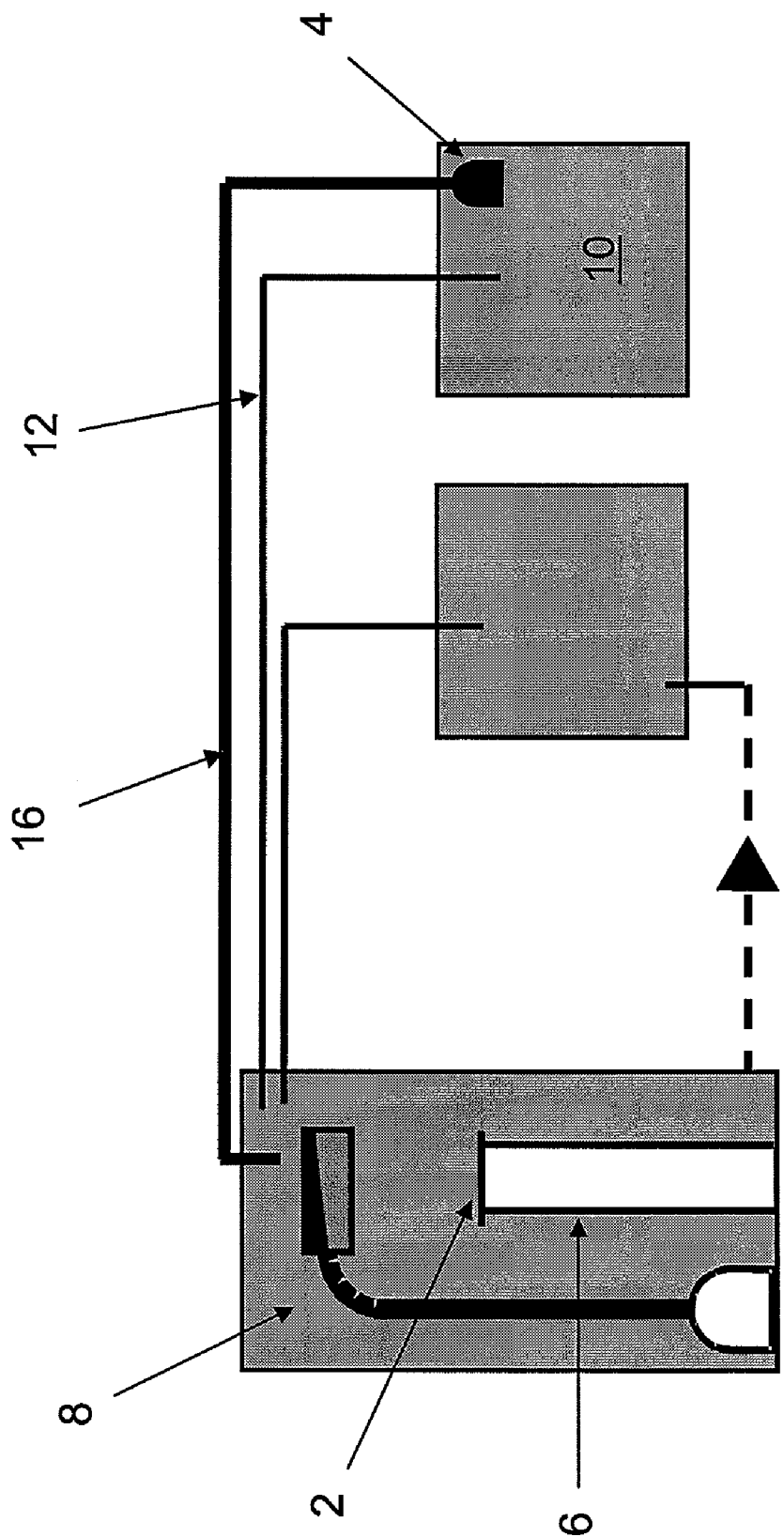
FIGS. 1 to 3 are schematic drawings of suggested aircraft fuel tanks.

FIG. 1 is a schematic drawing of a suggested fuel tank system in an aircraft. The fuel tank system includes two overpressure protectors 2, 4 both of which are in the form of frangible discs. The first frangible disc 2 is mounted in a baffle 6 located in the surge tank 8. This frangible disc 2 is arranged to fail in response to excessive pressure differentials that may occur during operation of the aircraft. The second overpressure protector (frangible disc) 4 is mounted on the end of a pipe 16 linking the center fuel tank 10 with the surge tank 8. The second frangible disc 4 is also arranged to fail in response to excessive pressure differentials. In the center fuel tank 10, such excessive pressure differentials may typically occur during refuelling when, for example, the primary venting pipe 12 to the surge tank 8 becomes blocked.

Figure 2:
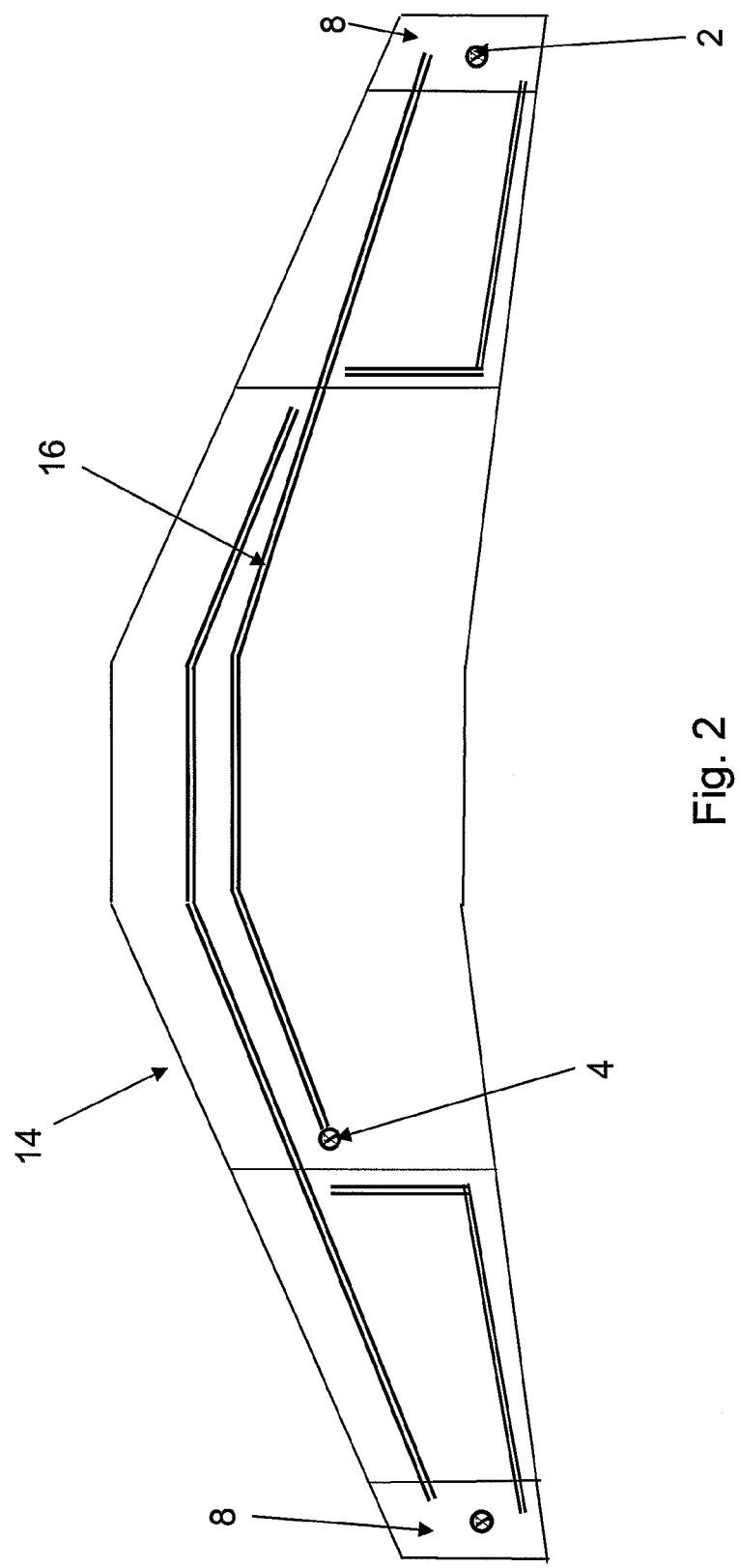

FIG. 2 is a schematic of the suggested fuel tank system of FIG. 1 in the aircraft wings 14. The central fuel tank 10 is large (capacity of around 50,000 liters). The overpressure protector 4 of the center tank 10 may therefore be susceptible to spurious failures due to the movement of the fuel, especially during extreme manoeuvres. To mitigate this problem, the overpressure protector 4 is located on the opposite side of the large center fuel tank 10, to the surge tank 8 to which it vents. The pipe 16 connecting the overpressure protector 4 (in the form of a frangible disc) to the surge tank 8 is therefore relatively long, and correspondingly heavy.

Figure 3:
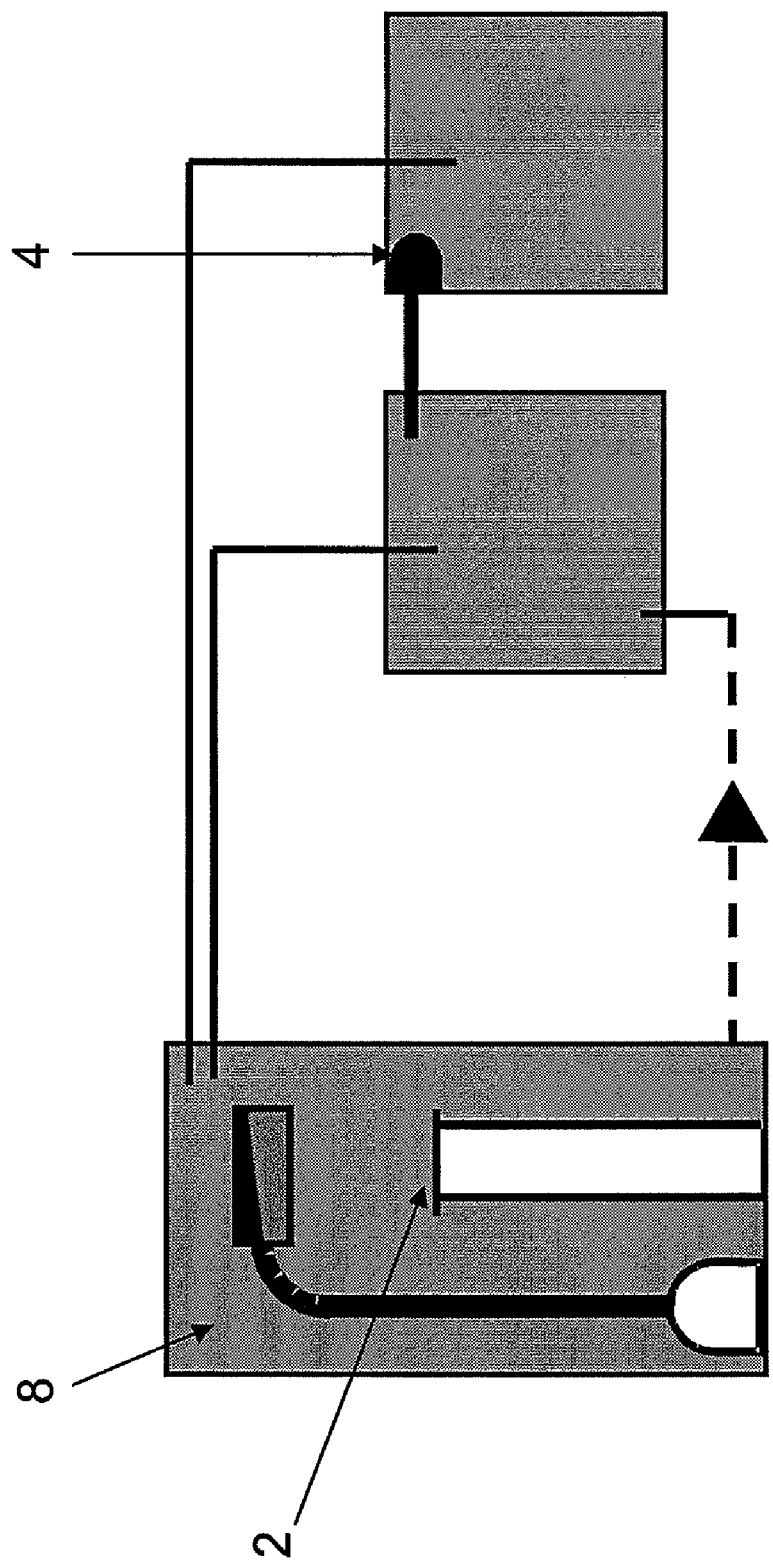

FIG. 3 shows schematically an alternative suggested fuel tank system on an aircraft. The second overpressure protector 4 is in the form on an overpressure valve 4 between the center tank 10 and feed tank 18. The overpressure valve 4 indirectly vents to the surge tank 8 (via the primary vent pipe in the feed tank 18). Whilst the valve 4 located in the side wall mitigates the need for a long length of pipe, valve 4 does tend to be susceptible to jamming. Furthermore, it is not possible to detect easily when the valve has jammed, or to test whether the valve is still working, without accessing the interior of the fuel tanks 10, 18. The arrangement in FIG. 3 therefore tends not to meet aircraft safety requirements, and the fuel system shown in FIG. 3 may need to be modified to include the pipe and frangible disc arrangement shown in FIGS. 1 and 2 as a back-up means of pressure relief.

In all of the suggested arrangements in FIGS. 1 to 3, the aircraft may be subjected to prolonged periods of down-time whilst the overpressure protector(s) are checked or re-set.

Figure 4A:
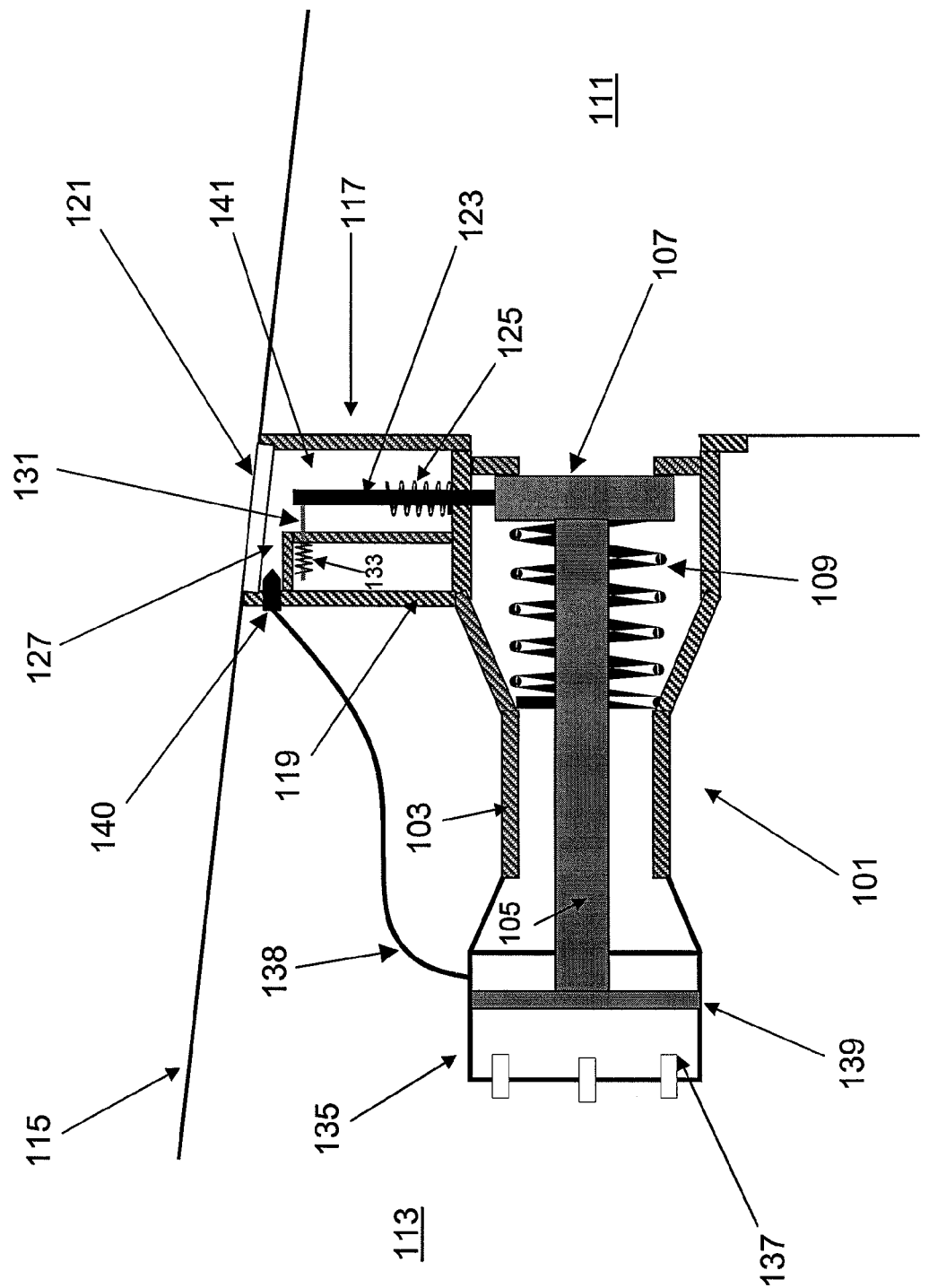
FIGS. 4a and 4b show an overpressure valve in an aircraft fuel tank assembly according to a first embodiment of the invention.
Figure 4B:
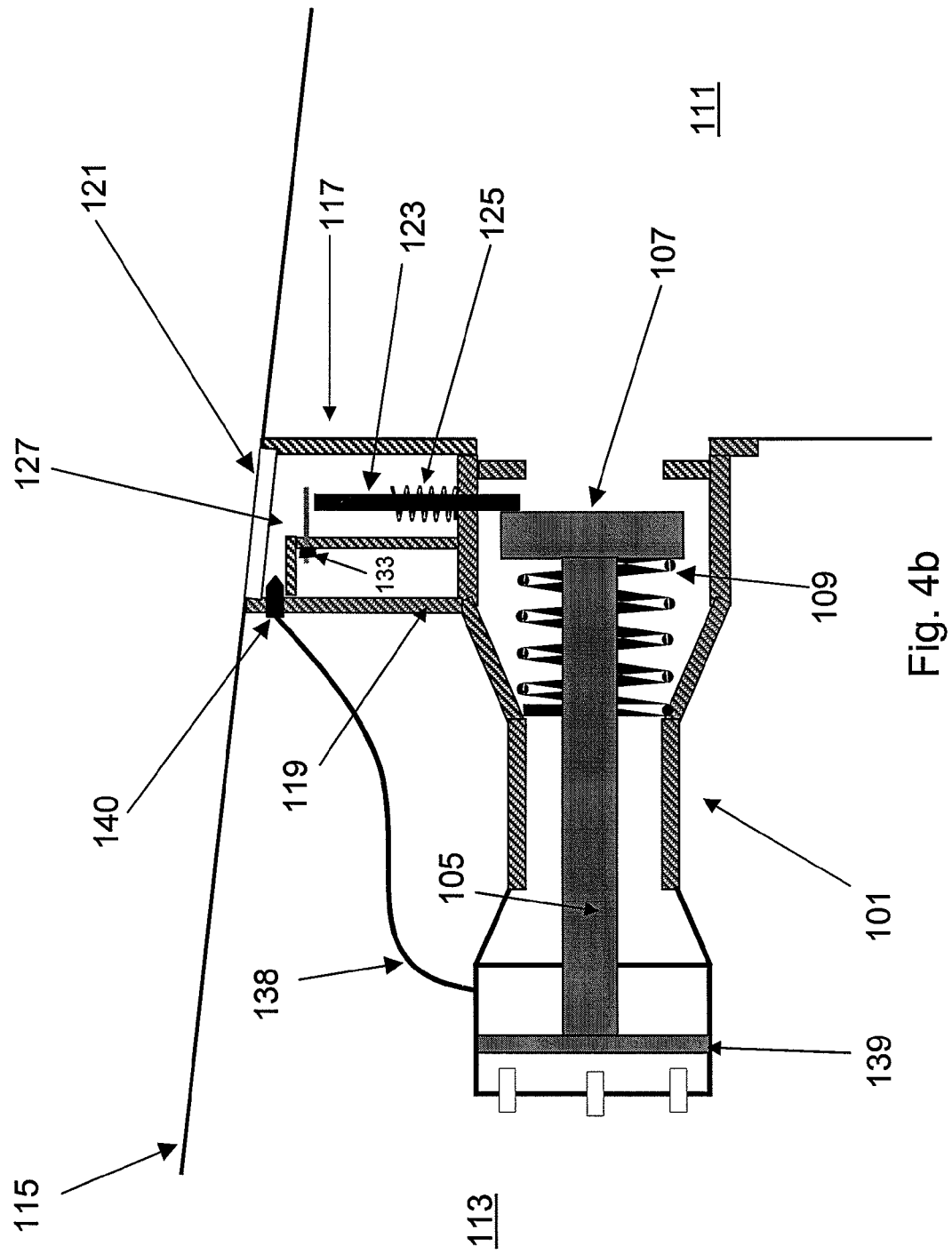

FIGS. 4a and 4b show a cut-away view of an overpressure valve in an aircraft fuel tank assembly according to a first embodiment of the invention. The overpressure valve 101 is in the form of a poppet valve and comprises a valve body 103 housing an axially mounted shaft 105. The shaft 105 includes at one end, a sealing member 107 and is resiliently biased by a coil spring 109 into the closed state (shown in FIG. 4a). In the closed state, the sealing member 107 abuts a valve seat on the housing 103 and prevents fluid communication through the valve 101.

FIG. 5 is a schematic of the fuel tank assembly in the first embodiment. The overpressure valve 101 is a tank-to-tank overpressure valve between a large central fuel tank 111 and a relatively small outboard fuel tank 113. The valve 101 is located beneath the upper wing skin 115 and in the rib boundary between the tanks. The outboard fuel tank 113 vents to the surge tank 114.

Reference is made again to FIGS. 4a and 4b. In the event of an excessive pressure differential between the two fuel tanks, the shaft 105 moves, against the biasing spring 109, such that the sealing member 107 lifts away from the valve housing 103. In this open state (shown in FIG. 4b) fluid communication through the valve 101 is enabled so as to provide pressure relief.

The fuel tank assembly comprises an indicator 117 for indicating whether the overpressure protector is in the open or closed state. The indicator 117 is generally contained within a housing 119 recessed from the wing skin 115 and enclosed at its upper surface by a removable transparent panel 121. The indicator housing 119 is entirely sealed from the fuel tanks 111, 113 and does not store any fuel. It will be appreciated that although the housing is fairly small, relative to the fuel tanks, and represents only a relatively small change in the shape of the general envelope defined by the fuel tanks, it is taken to be outside the fuel tanks. The indicator comprises a rod 123, which is resiliently mounted in the housing on a coil spring 125, such that one end of the rod 123 is in contact with the sealing member 107 of the valve. When the valve moves to the open state, the rod 123 (under the action of the spring 125) is urged downwards to the position shown in FIG. 4b. The rod 123 is therefore moveable, dependent on (i.e. in dependence on) the state of the overpressure valve 101.

The indicator 117 also comprises a flag 127 in the form of a coloured marker 129 on a plate 131. The plate 131 is also resiliently mounted in the housing 119. The plate 131 is urged against the rod 123 such that when the rod 123 moves downwards, the flag 127 moves from a hidden position (shown in FIG. 4a) to a visible position (shown in FIG. 4b) in which the coloured marker 129 can be seen through the transparent panel 121.

Figures 6A, 6B:
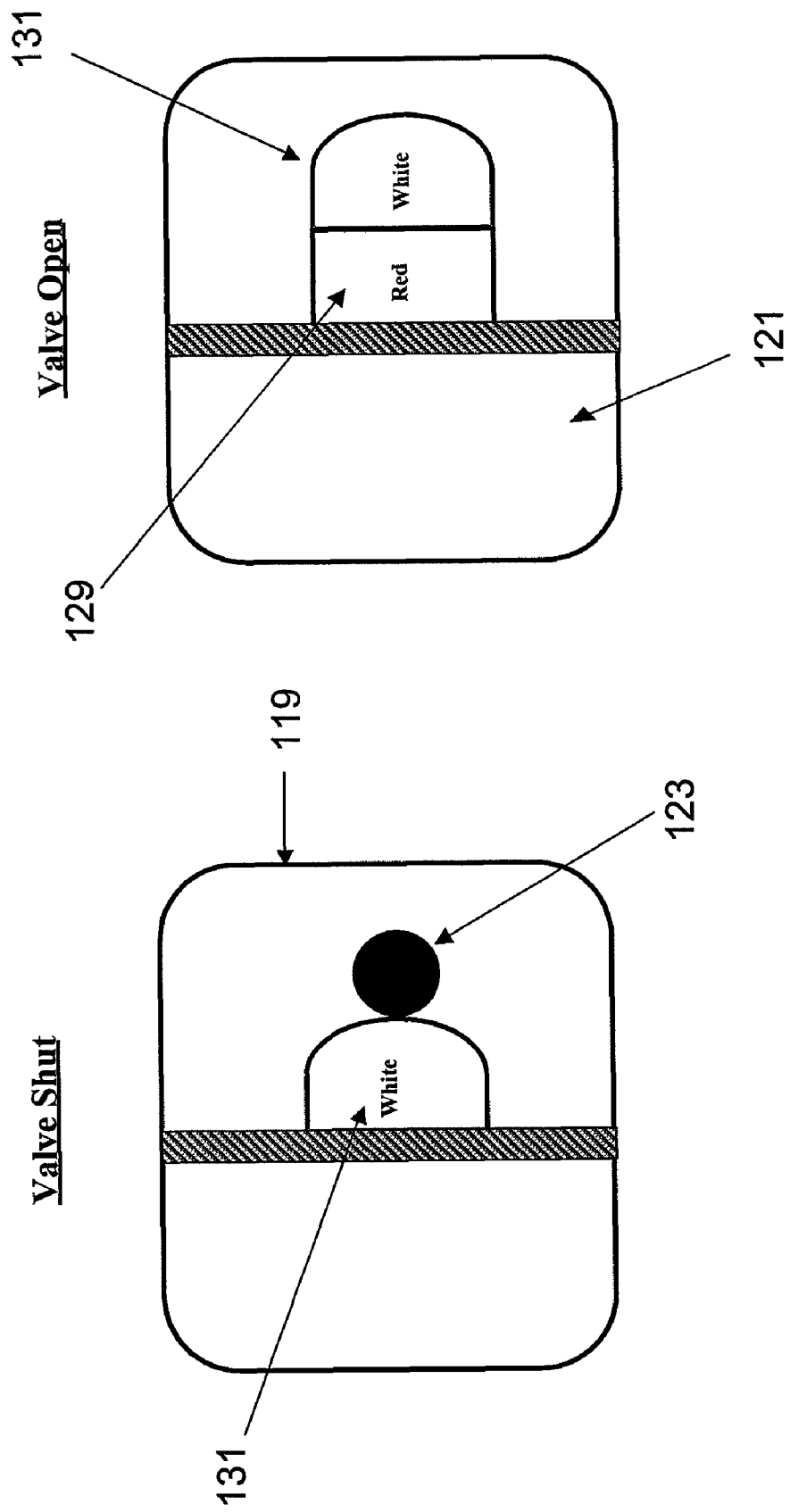
FIGS. 6a and 6b show part of the indicator in the first embodiment of the invention.

A plan view of the transparent panel 121 is shown in FIGS. 6a and 6b. FIG. 6a shows the view through the transparent panel 121 when the valve 101 is in the closed state. The top of the rod 123, and a plain portion of the plate 131, can be seen. FIG. 6b shows the view through the transparent panel 121 when the valve 101 has moved to the open state. The flag 127, under the action of its associated spring 133, is moved to a position in which the marker 129 can be seen from a position above the transparent panel 121.

It will be appreciated that the indicator 117 is thus arranged to provide an indication of the state of the overpressure valve 101. In addition, the indication of the indicator is able to be sensed (i.e. seen, in the first embodiment of the invention) at a location outside of the first and second fuel tanks 111, 113.

In the first embodiment of the invention, the rod also latches the valve in the open position. The indicator is arranged to provide a continuous indication when the rod has latched the valve open, but that indication will change when the rod unlatches the valve enabling it to move to the closed state (see below). Thus, in the first embodiment, the indicator provides a 'real time' indication of the state of the valve.

The first embodiment of the invention enables an engineer working in the vicinity of the wing of an aircraft to which the assembly is fitted, to tell when the overpressure valve 101 is in the open or closed state. This ensures early detection of a fault that may have led to the valve 101 opening. The first embodiment of the invention also reduces the need to access the interior of the fuel tanks to check the state of the valve. This enables the aircraft downtime for checking the valve to be reduced.

In addition, the ability to see the state of the valve makes it more able to be relied upon. This mitigates the need for additional overpressure protectors. In the first embodiment of the invention, there is no additional frangible disc on a large heavy pipe as was described above with reference to FIG. 2.

Referring back to FIGS. 4a and 4b, the assembly also comprises a test mechanism 135 for effecting movement of the valve from the closed to open positions. The test mechanism comprises a pressure chamber 137 located at one end of the valve shaft 105, and a conduit 138 linking the pressure chamber 135 with the indicator housing. The pressure chamber houses a sealing member 139 located on the opposite end of the shaft 105 to the valve sealing member 107, and of slightly larger diameter than that valve sealing member 107. The pressure chamber is open, at one end, to one of the fuel tanks 113. The other end of the pressure chamber is closed and a flexible seal is formed around the shaft of the overpressure valve. The conduit 138 is in communication with the closed side of the pressure chamber.

To effect movement of the overpressure valve from the closed state to the open state, the transparent panel 121 is first removed. The recess below the transparent panel is, as mentioned above, outside the fuel tanks and the test mechanism 135 is therefore operable from a location outside the fuel tanks. Pressure is then applied at the inlet 140 of the conduit 138 by way of compressed air (not shown). When the pressure in the sealed side of the chamber 137 exceeds that in the fuel tank 113 (and therefore in the open side of the pressure chamber), by a sufficient amount so as to overcome both the pressure on the opposite side of the pressure chamber, and the resilient bias of the valve coil spring 109, the valve moves to the open position (shown in FIG. 4b).

The test mechanism 135 therefore provides a simple, quick and effective way of testing the overpressure valve without needing to access the fuel tank interior. In addition, the arrangement shown in the first embodiment does not contain any complex fixed link arrangement and is therefore relatively light, easy to install and does not occupy too much space.

The combination of the test mechanism and the indicator, provided in the first embodiment of the invention is especially beneficial since they complement each other: the test mechanism ensures relatively simple testing of the valve, and the indicator provides a straightforward indication of the movement of the valve that ensues not only during normal operation but also during testing. The need for the undesirable frangible disc and piping arrangement discussed with reference to FIGS. 1 and 2 is also removed.

The aircraft of the first embodiment also comprises a re-set mechanism 141. The re-set mechanism 141 shares common elements with the indicator 117 as will be explained below.

The re-set mechanism 141 includes the resiliently mounted rod 123 of the indicator 117. As well as acting as a follower element and moving dependent on the state of the valve (see discussion above with reference to the indicator), the rod 123 also acts as a latching element. When the valve is in the closed state, the rod 123 is urged against the sealing member 107. When the valve moves to the open state (see FIG. 4b), the rod 123 is moved downwards thereby blocking the return path of the sealing member 107.

The rod 123 protrudes into the indicator housing. It is accessible from outside the fuel tanks 113, 111, by removing the transparent panel 121. To operate the re-set mechanism 141, the panel 121 is removed, the flag 127 is pushed backwards and the rod 123 gripped and pulled upwards against the spring 125. The valve (under the action of the valve spring 109 and/or pressure differential across the tanks) returns to the closed position. When the rod 123 is released, it again adopts the position shown in FIG. 4a (and the flag is constrained against the rod). The reset mechanism therefore enables the valve to be re-set without accessing the interior of the fuel tanks 111, 113.

In the first embodiment of the invention, the indicator and re-set mechanism are all mechanically associated with the valve. They do not include any electronic components which may be considered unsafe in the aircraft fuel tank environment.

The first embodiment of the invention provides many of the advantages associated with a known overpressure valve, without many of the associated reliability/safety drawbacks.

Figure 7:
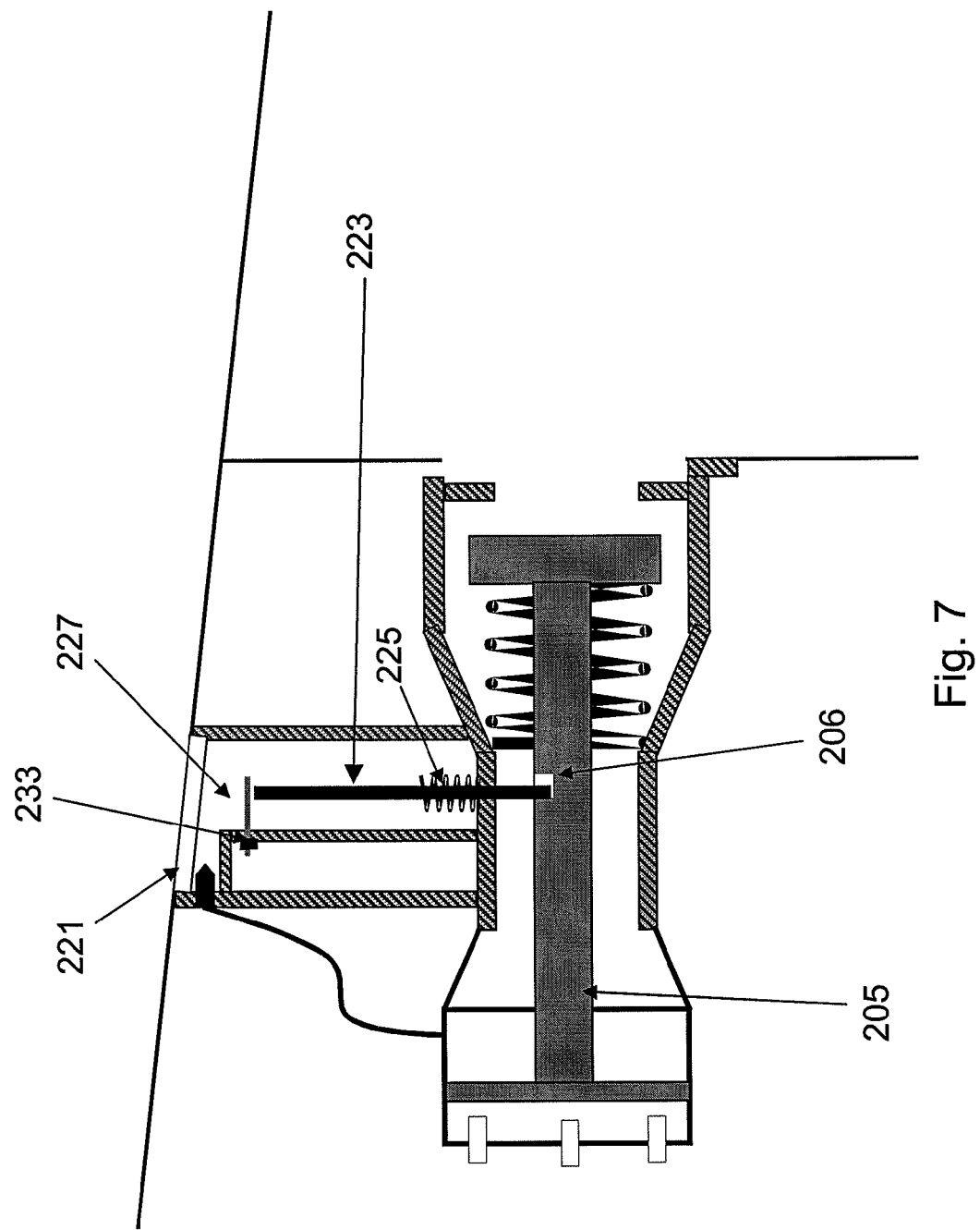
FIG. 7 shows an overpressure valve in an aircraft fuel tank assembly according to a second embodiment of the invention.

FIG. 7 shows an overpressure protector in an aircraft fuel tank assembly according to a second embodiment of the invention. The arrangement is similar to the first embodiment of the invention except for the differences described below. Firstly, the shaft 205 of the valve includes a notch 206 on one side. When the valve is in the closed position, the notch 206 is positioned to the right (with reference to FIG. 7) of the rod 223. The rod is urged downwards by the spring 225 and when the valve is in the closed state, the rod 223 is pressed against the shaft 205. In the open state (the view shown in FIG. 7), the shaft 205 is moved to the left such that the rod 223 moves down and cooperates with the notch 206.

As with the first embodiment, the rod 223 acts as a follower element and the downward movement of the rod (associated with the valve) enables the flag 227 to move to a visible position. The indication is therefore visible dependent on the position of the rod 223. In addition, the rod 223 acts as a latching member with the notch 206 and therefore holds the valve in the open position. The rod 223 is accessible through the transparent panel 221 and can be manually lifted (out of the notch) so as to enable the valve to return to the closed position.

Figure 8:
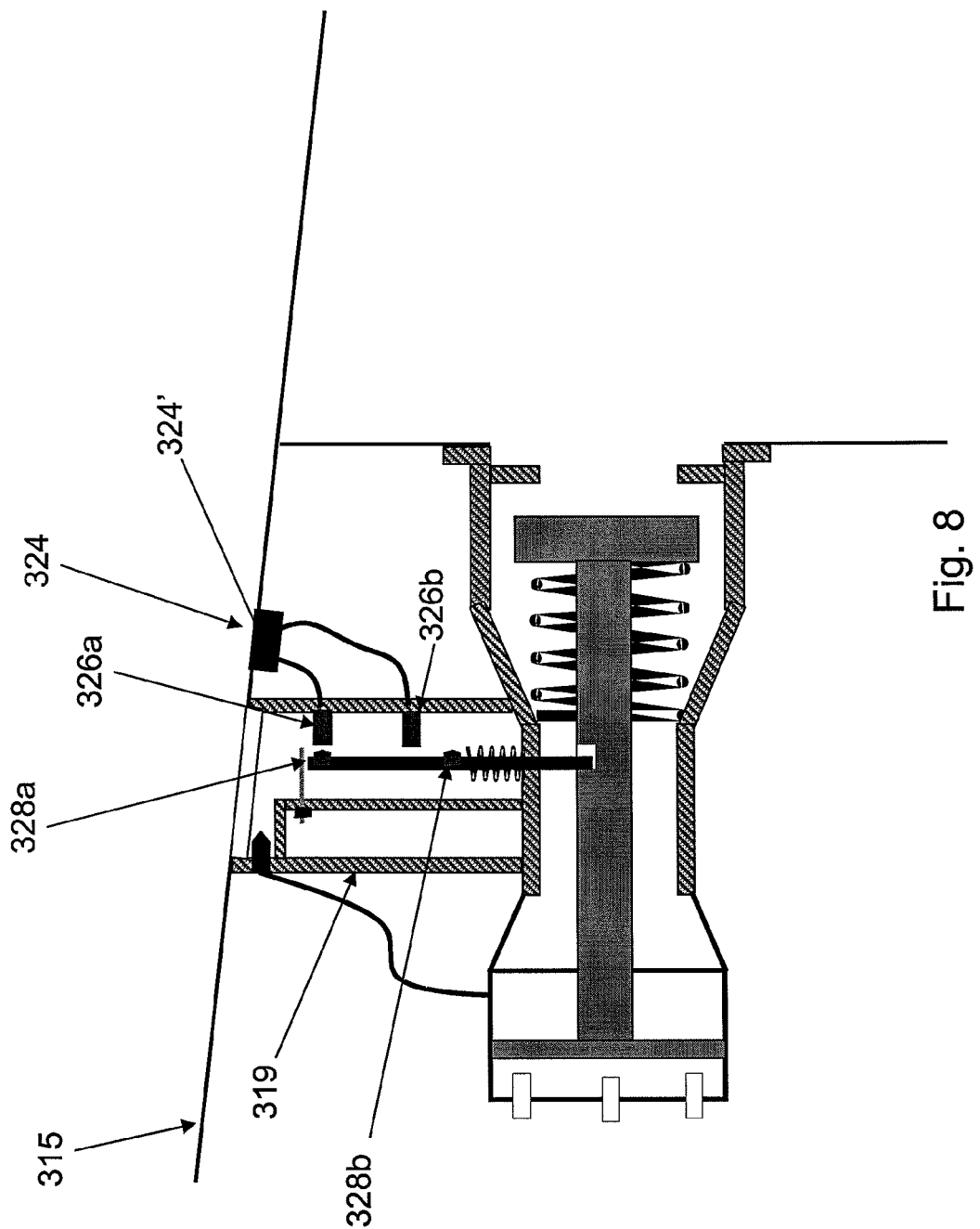
FIG. 8 shows an overpressure valve in an aircraft fuel tank assembly according to a third embodiment of the invention.

FIG. 8 shows an overpressure valve in an aircraft fuel tank assembly according to a third embodiment of the invention. The arrangement is identical to that of the second embodiment except for the addition of some further components in the indicator.

The indicator includes a low-power electrical unit 324 with integral display 324' on the exterior of the aircraft wing 315. The unit 324 is connected to two position sensors 326a, 326b spaced apart of the interior of the indicator housing 319. The position sensors 326a, 326b are arranged such that, when the valve is open, the upper sensor 326a is inline with a first marker 328a on the rod 323 and, when the valve is closed, the lower sensor 326b is inline with a lower marker 328b on the rod 323. The position sensors 326a, 326b transmit a signal to the unit when they are inline with a marker 328, and from that signal, the integral display 324' is arranged to indicate the position of the overpressure valve. The position sensors are therefore arranged to transmit a signal dependent on the position of the rod 323 (which is, of course, associated with the overpressure protector, and thus the state of the overpressure protector).

Figure 9:
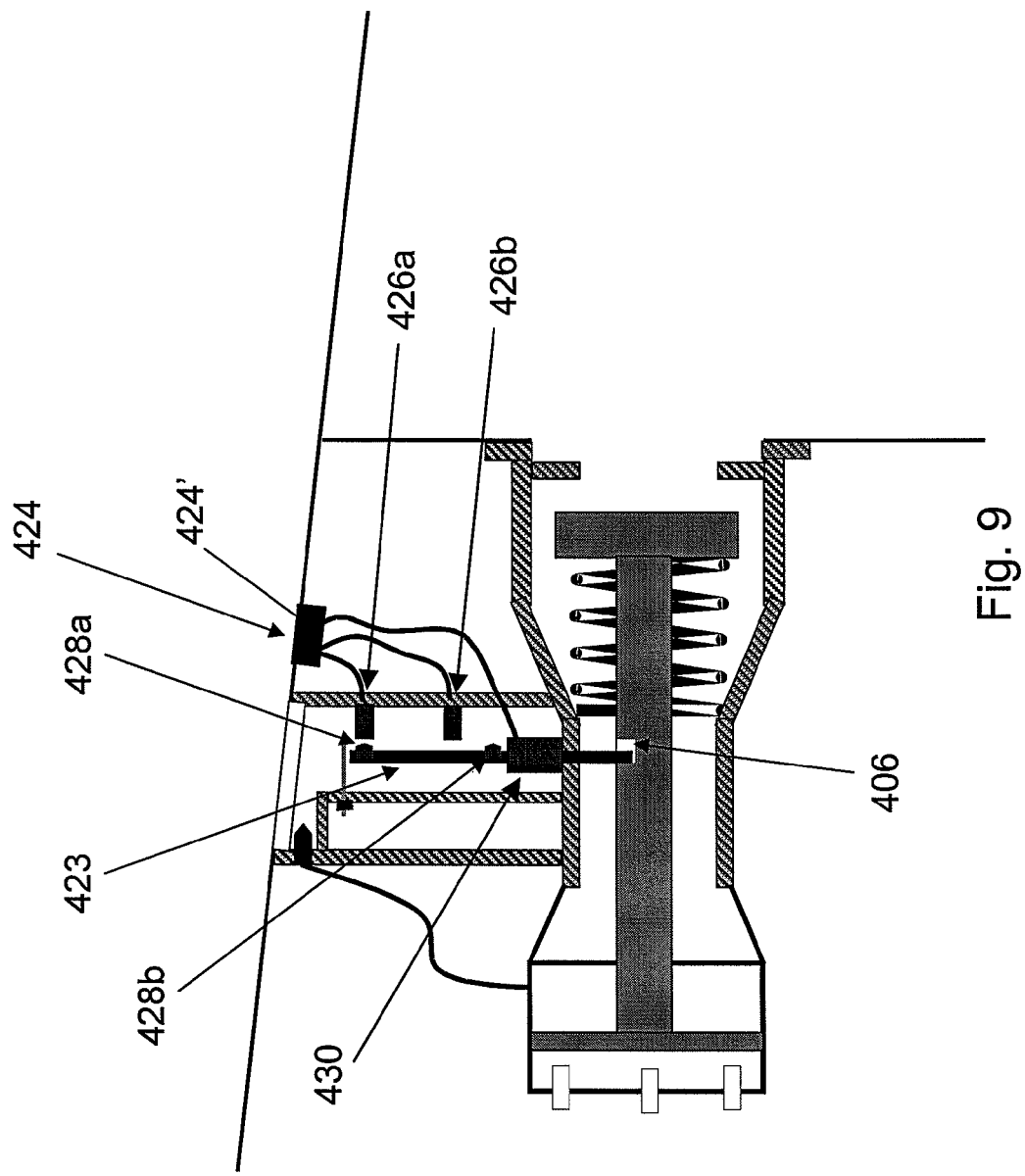
FIG. 9 shows an overpressure valve in an aircraft fuel tank assembly according to a fourth embodiment of the invention.

FIG. 9 shows a variation on the third embodiment. In this fourth embodiment, the indicator and the re-set mechanism are yet further inter-linked. The spring has been replaced with a solenoid 430 for moving the rod 423 up and down. The solenoid 430 is connected to a unit 424. The unit has an integral display 424'. In the fourth embodiment, the unit 424 includes means for providing low-voltage power to the solenoid 430, and a switch to control the solenoid 430 so as to move the rod 423 up or down. When the lower sensor 426*b* is level with the lower marker 428*b* (i.e. the valve is closed), the unit 424 controls the solenoid 430 so as to urge the rod 423 downwards. Thus, when the valve opens, the rod 423 latches with the notch 406. To return the valve to the closed state, an engineer pushes the flag 427 backwards and operates the switch on the unit 424 such that the solenoid 430 lifts the rod 423 out of the notch 406 to a position in which the lower marker 428*b* is again level with the lower sensor 426*b*. The flag 427 can be released and allowed to rest against the rod 423. The solenoid 430 re-set mechanism can therefore be easily operated by an engineer by simply activating the switch on the unit 424.

Figure 10B:
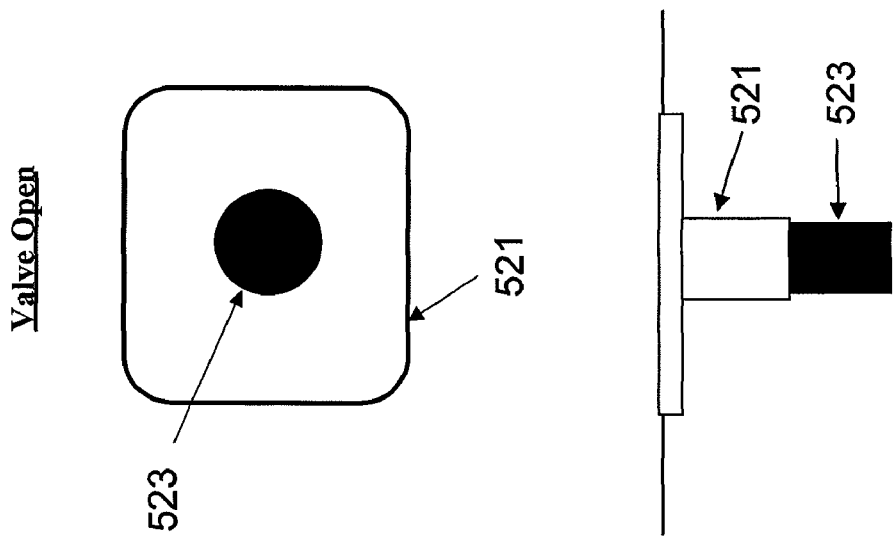
FIGS. 10a and 10b show a fifth embodiment of the invention from plan and side views.
Figure 10A:
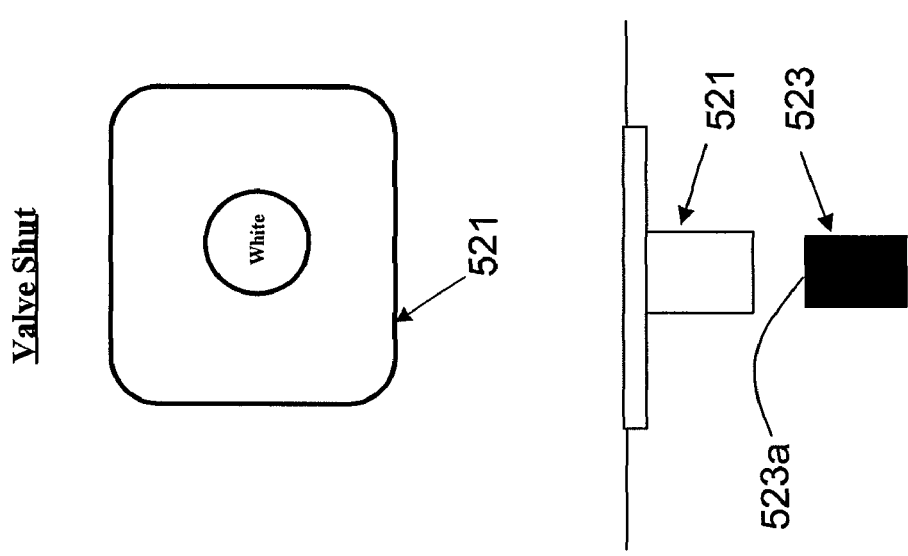

FIGS. 10*a* and 10*b* show a fifth embodiment of the invention from plan and side views. The arrangement is similar to the second embodiment but does not comprise the test-mechanism or re-set mechanisms of that embodiment. In addition the fifth embodiment does not include the coloured marker on the plate (131). In the fifth embodiment, the overpressure protector is still in the form of a valve. The valve shaft (not shown) includes a protrusion where, in the valve of the second embodiment, there is a notch. The rod 523 is biased in a downward direction against the valve shaft. The bias is sufficiently weak to allow the rod 523 to move upwards (against the bias) if and when the valve opens (i.e. the protrusion moves to a position under the rod). Thus, when the valve is closed, the rod 523 is positioned lower than when the valve is open.

The top 523*a* of the rod 523 is coloured black. In the closed state (FIG. 10*a*), the rod is sufficiently far away from the transparent panel 521 not to be clearly visible through the panel 521. However, when the rod is raised by the projection as the valve opens (FIG. 10*b*), the rod abuts the transparent cover 521. In such a configuration, the black top 523*a* of the rod is clearly visible through the panel 521 and therefore from a location outside the aircraft. It is therefore possible to determine the state of the valve simply by looking at the panel.

Figure 11:
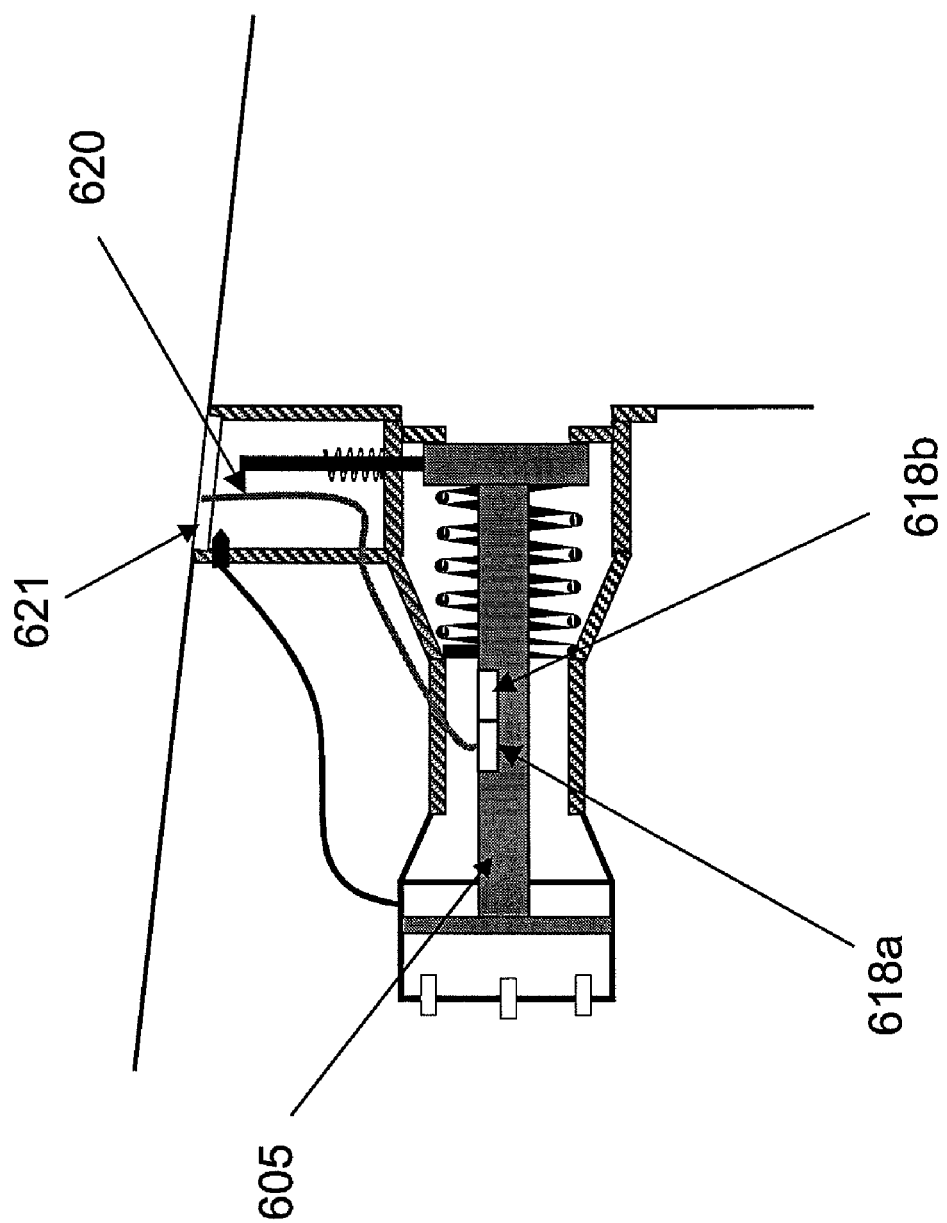
FIG. 11 shows an overpressure valve in an aircraft fuel tank assembly according to a sixth embodiment of the invention.

FIG. 11 shows an overpressure valve on an aircraft according to a sixth embodiment of the invention. The indicator comprises a pair of coloured markers 618*a*, 618*b* on the valve shaft 605 and a length of fiber optic cable 620 connected between the valve body and the transparent panel 621. The rearward marker 618*a* is white and the foremost marker 618*b* is red. The location of the fiber optic cable 620 is fixed. The fiber optic cable 620 includes some fiber arranged to illuminate the markers and some cables arranged to transmitted the reflected colour back along the fiber. Thus the cable is arranged to transmit, to the panel 621 (reflected) white light when the valve is closed (shown in FIG. 11) and (reflected) red light when the valve is open (not shown).

According to another embodiment (not shown) the overpressure valve is automatically reset after it has moved to the open position (and once the excessive pressure differential has subsided). In this embodiment, an indicator associated with the valve is arranged to continue indicating that the valve changed from the closed to open state, even after the valve has automatically re-set. Thus the indicator does not necessarily provide a 'real time' indication of the state of the indicator, but merely that the valve has, at some point, opened. The indicator is arranged to be manually reset by an engineer.

According to yet another embodiment (not shown) an aircraft includes a fuel tank overpressure protector unit. The unit comprises an overpressure protector in the form of a frangible disc, and an indicator comprising a linkage arrangement. The linkage arrangement is both associated with the frangible disc, and partially protrudes from the fuel tank. Failure of the disc causes movement of the linkage arrangement (using a spring biasing action) and the linkage thereby provides an indication of the state of the frangible disc to a location outside the fuel tanks.

Whilst the present invention has been described and illustrated with reference to particular embodiments, it will be appreciated by those of ordinary skill in the art that the invention lends itself to many different variations not specifically illustrated herein. For example, in embodiments similar to the sixth embodiment, the fiber optic cable could run to any number of locations on the aircraft. For example, the fiber optic cable could be arranged to run to the cockpit such that the indication is able to be sensed in the cockpit. The fiber optic cable could run to a detector that converts the signal into an electrical signal. This, in turn, could be connected to an audio alarm.

In embodiments similar to the third and/or fourth embodiments of the invention, the electrical unit need not have an integral display. The display may be positioned elsewhere on the aircraft, for example in the cockpit or on a re-fuel control panel. Alternatively or additionally, the unit itself may be located elsewhere in the aircraft, such as in the cockpit or on the re-fuel control panel.

The indication need not be a 'positive' indication (e.g. a red colour signal) when the protector is in an open state and a 'negative' indication (the removal of the colour signal/white colour signal) when the valve is closed. The indication could be the other way round, and the indication could be any indication that enables the state of the overpressure protector to be sensed outside the fuel tanks.

Insofar as the features of the embodiments discussed above are concerned, the aircraft may include only one of those features (for example only the test mechanism) or any combination of them (for example the test mechanism and the re-set mechanism).

The test-mechanism may comprise a direct mechanical linkage for moving the valve from the closed state. The re-set mechanism may be arranged to move the valve between the two states. The re-set and test mechanisms may therefore be one and the same, or share common components.

In the above-described embodiments, the overpressure protector is near the upper surface of the aircraft wing. The overpressure protector may be any suitable location on the aircraft, for example near the lower portion of the wing, or near a re-fuel control panel.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft fuel tank assembly, comprising: a first fuel tank, a second fuel tank, and a tank-to-tank overpressure protector, wherein the overpressure protector has a closed state for substantially preventing fluid communication between said first fuel tank and said second fuel tank through the overpressure protector, and an open state for enabling fluid communication between said first fuel tank and said second fuel tank through the overpressure protector to provide pressure relief,
wherein the fuel tank assembly further comprises a mechanical indicator for indicating whether the overpressure protector is in the open or closed state, wherein said indicator comprises a follower element which is moveable dependent on the state of the overpressure protector, wherein the indication of the indicator is generated dependent on the position of the follower element, and
wherein said open or closed state indication of the indicator is sensed at a location outside of the first and second fuel tanks.

2. A fuel tank assembly according to claim 1, wherein the indicator is mechanically associated with the overpressure protector.

3. A fuel tank assembly according to claim 1, wherein the indicator comprises a flag, the flag being moveable between a hidden position and a visible position dependent on the state of the overpressure protector.

4. A fuel tank assembly according to claim 1, wherein the indicator comprises a fibre optic cable arranged to transmit an optical signal dependent on the state of the overpressure protector and being arranged to output said signal, for use as the indication, to a location outside the first and second fuel tanks.

5. A fuel tank assembly according to claim 1, wherein the part of the indicator arranged to make the indication is wholly located outside the first and second fuel tanks.

6. A fuel tank assembly according to claim 1, wherein the overpressure protector is in the form of an overpressure valve.

7. An aircraft fuel tank overpressure protector unit for use in the fuel tank assembly according to claim 1, the unit comprising an overpressure protector and an indicator mechanically associated therewith, for providing an indication remote from the overpressure protector.

8. An aircraft fuel tank overpressure protector unit according to claim 7 wherein the overpressure protector is a spring-loaded overpressure valve comprising a shaft and a sealing member moveable between an open state and a closed state,
the follower element is biased against the shaft or sealing member so as to be moveable dependent on the state of the overpressure valve, and
the unit further comprises a flag, the flag being biased against the follower element so as to be moveable between a hidden position and a visible position dependent on the position of the follower element.

9. An aircraft fuel tank overpressure protector unit according to claim 7, further comprising a fibre optic cable arranged to transmit an optical signal dependent on the state of the overpressure protector.

10. In combination, an aircraft and a fuel tank assembly, wherein said fuel tank assembly comprising a first fuel tank, a second fuel tank and a tank-to-tank overpressure protector between said first fuel tank and said second fuel tank, wherein the overpressure protector has a closed state for substantially preventing fluid communication between said first fuel tank and said second fuel tank through the overpressure protector, and an open state for enabling fluid communication between said first fuel tank and said second fuel tank through the overpressure protector to provide pressure relief,
wherein the fuel tank assembly further comprises a mechanical indicator for indicating whether the overpressure protector is in the open or closed state, wherein said indicator comprises a follower element which is moveable dependent on the state of the overpressure protector, wherein the indication of the indicator is generated dependent on the position of the follower element, and
wherein said open or closed state indication of the indicator is sensed at a location outside of the first and second fuel tanks.

11. The combination according to claim 10, wherein the indication of the indicator is able to be sensed in the aircraft cockpit.

12. The combination according to claim 10, wherein the indication of the indicator is operable to be visible on the exterior of the aircraft wing.

13. In combination, an aircraft wing and a fuel tank assembly, wherein said fuel tank assembly comprising a first fuel tank, a second fuel tank, and a tank-to-tank overpressure protector between said first fuel tank and said second fuel tank, wherein said overpressure protector has a closed state for substantially preventing fluid communication between said first fuel tank and said second fuel tank through the overpressure protector, and an open state for enabling fluid communication between said first fuel tank and said second fuel tank through the overpressure protector to provide pressure relief, and a mechanical indicator for indicating whether the overpressure protector is in the open or closed state, wherein said indicator comprises a follower element which is moveable dependent on the state of the overpressure protector, wherein the indication of the indicator is generated dependent on the position of the follower element, and
wherein said open or closed state indication is sensed at a location outside of the first and second fuel tanks.

14. A method of detecting the open state or closed state of an overpressure protector on an aircraft, comprising the steps of:
providing a fuel tank assembly having a first fuel tank and a second fuel tank,
providing a tank-to-tank overpressure protector between said first fuel tank and said second fuel tank, wherein the overpressure protector has a closed state for substantially preventing fluid communication between said first fuel tank and said second fuel tank through the overpressure protector, and an open state for enabling fluid communication between said first fuel tank and said second fuel tank through the overpressure protector to provide pressure relief,
providing a mechanical indicator for indicating whether the overpressure protector is in the open or closed state, wherein said indicator comprises a follower element which is moveable dependent on the state of the overpressure protector, and wherein the indication of the indicator is generated dependent on the position of the follower element,
sensing said open or closed state indication of the indicator at a location outside of the first and second fuel tanks.

* * * * *